(12) United States Patent
Wachtfogel et al.

(10) Patent No.: US 8,379,852 B2
(45) Date of Patent: Feb. 19, 2013

(54) PROCESSING VIDEO CONTENT

(75) Inventors: Reuven Wachtfogel, Jerusalem (IL); Kevin A. Murray, Fordingbridge (GB)

(73) Assignee: NDS Limited, Staines, Middlesex (GB)

( * ) Notice: Subject to any disclaimer, the term of this patent is extended or adjusted under 35 U.S.C. 154(b) by 547 days.

(21) Appl. No.: 12/448,789

(22) PCT Filed: Jan. 7, 2008

(86) PCT No.: PCT/IB2008/050027
§ 371 (c)(1),
(2), (4) Date: Aug. 17, 2009

(87) PCT Pub. No.: WO2008/084425
PCT Pub. Date: Jul. 17, 2008

(65) Prior Publication Data
US 2009/0296929 A1 Dec. 3, 2009

(30) Foreign Application Priority Data
Jan. 11, 2007 (IL) .......................................... 180663
Jun. 26, 2007 (IL) .......................................... 184232

(51) Int. Cl.
*H04N 7/167* (2011.01)
*H04L 9/32* (2006.01)

(52) U.S. Cl. ........ 380/201; 380/202; 380/203; 713/189; 713/190; 713/191; 713/192

(58) Field of Classification Search .................. 380/212, 380/201
See application file for complete search history.

(56) References Cited

U.S. PATENT DOCUMENTS

| | | | |
|---|---|---|---|
| 4,661,987 A * | 4/1987 | Anderson et al. ............. 382/277 |
| 5,008,754 A * | 4/1991 | Trevett et al. ................. 348/590 |
| 6,397,353 B1 | 5/2002 | Orlidge et al. |
| 7,327,408 B1 * | 2/2008 | Berman ........................ 348/794 |
| 8,111,928 B2 * | 2/2012 | Van Hook et al. ............ 382/232 |
| 2002/0041703 A1 * | 4/2002 | Fox ............................... 382/154 |
| 2003/0236978 A1 * | 12/2003 | Evans et al. ................... 713/164 |
| 2004/0111613 A1 | 6/2004 | Shen-Orr et al. |

(Continued)

FOREIGN PATENT DOCUMENTS
EP 1 376 302 A2 1/2004
JP 2006-244339 9/2006
(Continued)

OTHER PUBLICATIONS

Transmittal of the International Search Report and the Written Opinion of the International Searching Authority for the captioned application (15 pgs.).
Dave Marsh, "Output Content Protection and Windows Vista", (WinHEC 2005 Version, Apr. 27, 2005).
(Continued)

*Primary Examiner* — Longbit Chai
(74) *Attorney, Agent, or Firm* — Husch Blackwell LLP

(57) ABSTRACT

A method for processing video content is disclosed. The method comprises: receiving, in a hardware device connected in operation to a computer, encrypted, encoded video content; decrypting the encrypted, encoded video content to form decrypted, encoded video content; decoding a first portion of the decrypted, encoded video content to form a decrypted, decoded video content portion; re-encrypting the decrypted, decoded video content portion to form a re-encrypted, decoded video content portion; re-encrypting a second portion of the decrypted, encoded video content to form a re-encrypted, encoded video content portion; and outputting the re-encrypted, decoded video content portion and the re-encrypted, encoded video content portion to the computer.

49 Claims, 2 Drawing Sheets

U.S. PATENT DOCUMENTS

| | | | |
|---|---|---|---|
| 2004/0131183 A1* | 7/2004 | Sako | 380/202 |
| 2005/0175178 A1* | 8/2005 | Candelore et al. | 380/201 |
| 2006/0115083 A1* | 6/2006 | Candelore et al. | 380/216 |
| 2007/0204286 A1 | 8/2007 | Candelore | |
| 2008/0139881 A1* | 6/2008 | Cover et al. | 600/103 |

FOREIGN PATENT DOCUMENTS

| | | |
|---|---|---|
| WO | WO 98/27687 | 6/1998 |
| WO | WO 00/11866 | 3/2000 |
| WO | WO 01/73555 | 10/2001 |
| WO | WO 02/079955 A2 | 10/2002 |
| WO | WO 03/059039 A2 | 7/2003 |
| WO | WO 03/061173 A2 | 7/2003 |
| WO | WO 03/061288 A1 | 7/2003 |
| WO | WO 03/061289 A1 | 7/2003 |
| WO | WO 2005/002132 A2 | 1/2005 |
| WO | WO 2006/044749 A2 | 4/2006 |

OTHER PUBLICATIONS

"Protected Media Path" (Microsoft Corporation, 2009) also available on the World Wide Web at: http://msdn.microsoft.com/en-gb/library/aa376846(VS.85,printer).aspx.

"Sony Passage could cable marketplace", *Cable & Satellite International* (Mar.-Apr. 2003, pp. 22-25).

"SVP Open Content Protection System—Technical Overview" (SVP, Jan. 3, 2005).

Feb. 7, 2011 Office Communication in connection with prosecution of EP 08 700 205.1.

Apr. 15, 2010 Office Communication in connection with prosecution of EP 08 700 205.1.

Mar. 27, 2012 Office Communication in connection with prosecution of EP 08 700 205.1.

* cited by examiner

PROCESSING VIDEO CONTENT

RELATED APPLICATION INFORMATION

The present application is a 35 USC §371 application of PCT/IB/2008/050027, filed on 7 Jan. 2008 and entitled "Processing Video Content", which was published on 17 Jul. 2008 in the English language with International Publication Number WO 2008/084425 A2, and which relies for priority on Israel Patent Application No. 180663 filed on 11 Jan. 2007 and on Israel Patent Application No. 184232 filed on 26 Jun. 2007.

The present invention relates to a method of processing video content and a hardware device for processing video content.

BACKGROUND OF THE INVENTION

It has become increasingly common for users of personal computers (PC) to view video content via a PC. Video content is sent to a user's PC compressed (i.e. the quantity of data used to represent the video content is reduced without an excessive reduction in quality) and a video codec (a computer program that encodes and decodes video data) installed on the PC decodes (i.e. decompresses) the video data and sends the decoded/uncompressed content to the video card, which outputs the content to a display.

Unlike a consumer electronics (CE) device, which is a closed box where users cannot load software onto the box or add hardware to capture content, a PC is an open platform and cannot be trusted. There is therefore increasing concern about the piracy of video content that is decoded by and viewed via a PC.

In a Microsoft White Paper entitled "*Output Content Protection and Windows Vista*" (Dave Marsh, WinHEC 2005 Version, Apr. 27, 2005), methods are described that aim to make a Windows Vista based PC a safer place for content so that content providers will be happy to allow Windows Vista based PCs to play their content. The PC's software decoder resides in a 'protected environment'—a set of components, guidelines and tools that provides a 'wall' against outside attacks, where within the wall, content can be processed without undue risk of it being stolen. Also, uncompressed video is encrypted before being sent from decoder to video card over a user-accessible bus by Protected Video Path—User Accessible Bus (PVP-UAB) encryption.

However, decoding in software, even if secured within a protected environment, is still a weak link because decrypted, compressed video data, decrypted uncompressed video data and secret keys are stored in computer memory before PVP-UAB encryption is applied and can therefore be found and copied.

It is much better to decode video data in a secure hardware component and have the secure hardware component output uncompressed, encrypted video over a secure channel so that decrypted, compressed video data; decrypted, uncompressed video data; and secret keys are not accessible by the PC processor in the clear.

However, this requires the secure hardware component to output vast amounts of uncompressed video data, which requires lots of bandwidth and processing power. Universal Serial Bus (USB) and other peripheral device buses are not fast enough and even if they were, this would require a significant amount of bus resources. The problem is also much worse for High Definition (HD) video data, which contains up to six times as many pixels as Standard Definition (SD) video data.

International patent application WO02/079955 to NDS Limited (also published as US 2004-0111613) describes a system and a method for providing variable security mechanisms for securing digital content, in which a single security mechanism is not used for all content Instead, at least one characteristic or feature of the security mechanism is varied between units, instances or categories of content.

The disclosures of all references mentioned above and throughout the present specification, as well as the disclosures of all references mentioned in those references, are hereby incorporated herein by reference.

SUMMARY OF THE INVENTION

There is provided in accordance with an embodiment of the present invention a method for processing video content, the method including: receiving, in a hardware device connected in operation to a computer, encrypted, encoded video content; decrypting the encrypted, encoded video content to form decrypted, encoded video content; decoding a first portion of the decrypted, encoded video content to form a decrypted, decoded video content portion; re-encrypting the decrypted, decoded video content portion to form a re-encrypted, decoded video content portion; re-encrypting a second portion of the decrypted, encoded video content to for a re-encrypted, encoded video content portion; and outputting the re-encrypted, decoded video content portion and the re-encrypted, encoded video content portion to the computer.

Preferably, the outputting step comprises outputting the re-encrypted, decoded video content portion directly to a graphics renderer.

Preferably, the method further includes, in the computer: decrypting the re-encrypted, encoded video content portion to form a second decrypted, encoded video content portion; decoding the second decrypted, encoded video content portion to form a second decrypted, decoded video content portion; re-encrypting the second decrypted, decoded video content portion to form a second re-encrypted, decoded video content portion; and transferring the second re-encrypted, decoded video content portion to the graphics renderer.

Alternatively, the method further includes, in the computer:

decrypting the re-encrypted, encoded video content portion to form a second decrypted, encoded video content portion; decoding the second decrypted, encoded video content portion to form a second decrypted, decoded video content portion; re-encrypting the second decrypted, decoded video content portion to form a second re-encrypted, decoded video content portion; and transferring the re-encrypted, decoded video content portion and the second re-encrypted, decoded video content portion to the graphics renderer.

Preferably, re-encrypting the second portion of said decrypted, encoded video content includes re-encrypting the second portion of the decrypted, encoded video content such that it can only be decrypted by the computer.

Preferably, the re-encrypting step comprises re-encrypting the second portion of the decrypted, encoded video content according to a secure channel encryption algorithm.

Preferably, the first portion of the decrypted, encoded video content includes a critical portion of the decrypted, encoded video content.

Preferably, the first portion of the decrypted, encoded video content includes one or more portions of each frame of the decrypted, encoded video content.

Alternatively, the first portion of the decrypted, encoded video content includes part of the colour information for each pixel in each frame of the decrypted, encoded video content.

Alternatively, the first portion of the decrypted, encoded video content includes one or more video frames every few seconds.

Preferably, receiving the encrypted, encoded video content includes receiving the encrypted, encoded video content from the computer.

Preferably decrypting the encrypted, encoded video content includes: decrypting a first portion of the encrypted, encoded video content to form the first portion of the decrypted, encoded video content; and decrypting a second portion of the encrypted, encoded video content to form the second portion of the decrypted, encoded video content.

Preferably, the method further includes: combining the re-encrypted, decoded video content portion and the second re-encrypted, decoded video content portion.

Preferably, the combining step includes: overlaying the re-encrypted, decoded video content portion on top of the second re-encrypted, decoded video content portion or vice versa.

Preferably, the combining step includes: in the computer, combining the re-encrypted, decoded video content portion and the second re-encrypted, decoded video content portion to form re-encrypted, decoded video content, the method further including: in the computer, outputting the re-encrypted, decoded video content to the graphics renderer.

Preferably, the combining step comprises: in the graphics renderer, combining the re-encrypted, decoded video content portion and the second re-encrypted, decoded video content portion to form re-encrypted, decoded video content.

Preferably, the method further includes: decrypting the re-encrypted, decoded video content in the graphics renderer.

Preferably, the method further includes in said graphics renderer: decrypting the re-encrypted, decoded video content portion to form a decrypted, decoded video content portion; decrypting the second re-encrypted, decoded video content portion to form a second decrypted, decoded video content portion; and combining the decrypted, decoded video content portion and the second decrypted, decoded video content portion to form decrypted, decoded video content.

Preferably, the combining step includes: overlaying the de-encrypted, decoded video content portion on top of the second de-encrypted, decoded video content portion or vice versa.

Preferably, the method further includes: adding encoded video data to the second portion of the decrypted, encoded video content such that the encoded video data is invisible after the combining step.

Alternatively, the method further includes: adding decoded video data to the second decrypted, decoded video content portion such that the decoded video data is invisible after the combining step.

There is also provided in accordance with a further embodiment of the present invention a method for processing video content, the method including: receiving, in a hardware device connected in operation to a computer, encrypted, encoded video content; decrypting a first portion of the encrypted, encoded video content to form a first decrypted, encoded video content portion; decoding the first decrypted, encoded video content portion to form a decrypted, decoded video content portion; re-encrypting the decrypted, decoded video content portion to form a re-encrypted, decoded video content portion; decrypting a second portion of the encrypted, encoded video content to form a second decrypted, encoded video content portion; re-encrypting the second decrypted, encoded video content portion to form a re-encrypted, encoded video content portion; and outputting the re-encrypted, decoded video content portion and the re-encrypted, encoded video content portion to the computer.

Preferably, the decrypting of the first portion and the decrypting of the second portion of the encrypted, encoded video content include a single decryption operation.

There is also provided in accordance with a further embodiment of the present invention a method for processing video content, the method including: receiving, in a hardware device connected in operation to a computer, encrypted, encoded video content; decrypting a first portion of the encrypted, encoded video content to form a first decrypted, encoded video content portion; decoding the first decrypted, encoded video content portion to form a first decrypted, decoded video content portion; re-encrypting the first decrypted, decoded video content portion to form a first re-encrypted, decoded video content portion; and outputting the first re-encrypted, decoded video content portion and a remaining portion of the encrypted, encoded video content to the computer.

Preferably, the outputting step includes outputting the first re-encrypted, decoded video content portion directly to a graphics renderer.

Preferably, the method further includes, in the computer: decrypting the remaining portion of the encrypted, encoded video content to form a second decrypted, encoded video content portion; decoding the second decrypted, encoded video content portion to form a second decrypted, decoded video content portion; re-encrypting the second decrypted, decoded video content portion to form a second re-encrypted, decoded video content portion; and transferring the second re-encrypted, decoded video content portion to the graphics renderer.

Alternatively, the method further includes, in the computer: decrypting the remaining portion of the encrypted, encoded video content to form a second decrypted, encoded video content portion; decoding the second decrypted, encoded video content portion to form a second decrypted, decoded video content portion; re-encrypting the second decrypted, decoded video content portion to form a second re-encrypted, decoded video content portion; and transferring the first re-encrypted, decoded video content portion and the second re-encrypted, decoded video content portion to a graphics renderer.

Preferably, the method further includes: combining the first re-encrypted, decoded video content portion and the second re-encrypted, decoded video content portion.

Preferably, the combining step comprises: overlaying the first re-encrypted, decoded video content portion on top of the second re-encrypted, decoded video content portion or vice versa.

Preferably, the combining step comprises: in the computer, combining the first re-encrypted, decoded video content portion and the second re-encrypted, decoded video content portion to form re-encrypted, decoded video content, the method further including: in the computer, outputting the re-encrypted, decoded video content to the graphics renderer.

Preferably, the method further includes: combining the first re-encrypted, decoded video content portion and the second re-encrypted, decoded video content portion.

Preferably, the combining step includes: overlaying the first re-encrypted, decoded video content portion on top of the second re-encrypted, decoded video content portion or vice versa.

Preferably, the combining step includes: in the graphics renderer, combining the first re-encrypted, decoded video content portion and the second re-encrypted, decoded video content portion to form re-encrypted, decoded video content.

Preferably, the method further includes: decrypting the re-encrypted, decoded video content in said the graphics renderer.

Preferably, the method further includes in the graphics renderer: decrypting the first re-encrypted, decoded video content portion to form a first decrypted, decoded video content portion; decrypting the second re-encrypted, decoded video content portion to form a second decrypted, decoded video content portion; and combining the first decrypted, decoded video content portion and the second decrypted, decoded video content portion to form decrypted, decoded video content.

Preferably, the combining step includes: overlaying the first de-encrypted, decoded video content portion on top of the second de-encrypted, decoded video content portion or vice versa.

Preferably, the method further includes: adding decoded video data to the second decrypted, decoded video content portion such that the decoded video data is invisible after the combining step.

There is also provided in accordance with a further embodiment of the present invention a hardware device for processing video content, wherein the hardware device is connected in operation to a computer, the hardware device including: receiving means operable to receive encrypted, encoded video content; decryption means operable to decrypt the encrypted, encoded video content to form decrypted, encoded video content; decoding means operable to decode a first portion of the decrypted, encoded video content to form a decrypted, decoded video content portion; encryption means operable to re-encrypt the decrypted, decoded video content portion to form a re-encrypted, decoded video content portion, and further operable to re-encrypt a second portion of the decrypted, encoded video content to form a re-encrypted, encoded video content portion; and output means operable to output the re-encrypted, decoded video content portion and the re-encrypted, encoded video content portion to the computer.

Preferably, the decryption means includes a smart card.

Preferably, the hardware device is connected in operation to the computer via a universal serial bus interface.

Preferably, the decoding means includes a software decoder.

Preferably, the decoding means includes a hardware assisted software decoder.

There is also provided in accordance with a further embodiment of the present invention, a hardware device for processing video content, wherein the hardware device is connected in operation to a computer, the hardware device comprising: a receiver operable to receive encrypted, encoded video content; a decryptor operable to decrypt the encrypted, encoded video content to form decrypted, encoded video content; a decoder operable to decode a first portion of the decrypted, encoded video content to form a decrypted, decoded video content portion; an encryptor operable to re-encrypt the decrypted, decoded video content portion to form a re-encrypted, decoded video content portion, and further operable to re-encrypt a second portion of the decrypted, encoded video content to form a re-encrypted, encoded video content portion; and an outputter operable to output the re-encrypted, decoded video content portion and the re-encrypted, encoded video content portion to the computer.

Preferably, the decryptor includes a smart card.

Preferably, the hardware device is connected in operation to the computer via a universal serial bus interface.

Preferably, the decoder includes a software decoder.

Preferably, the decoder includes a hardware assisted software decoder.

There is also provided in accordance with a further embodiment of the present invention a hardware device for processing video content, where the hardware device is connected in operation to a computer, the hardware device including: a receiver operable to receive encrypted, encoded video content; a decryptor operable to decrypt a first portion of the encrypted, encoded video content to form a first decrypted, encoded video content portion; a decoder operable to decode the first decrypted, encoded video content portion to form a decrypted, decoded video content portion; and an encryptor operable to re-encrypting the decrypted, decoded video content portion to form a re-encrypted, decoded video content portion; wherein the decryptor is further operable to decrypt a second portion of said encrypted, encoded video content to form a second decrypted, encoded video content portion; and wherein the encryptor is further operable to re-encrypt the second decrypted, encoded video content portion to form a re-encrypted, encoded video content portion; the hardware device further including: an outputter operable to output the re-encrypted, decoded video content portion and the re-encrypted, encoded video content portion to the computer.

BRIEF DESCRIPTION OF THE DRAWINGS

Embodiments of the present invention will now be described, by way of example only, with reference to the accompanying drawings, wherein like reference numbers refer to like parts, and in which.

DETAILED DESCRIPTION OF EMBODIMENTS

Figure 1:
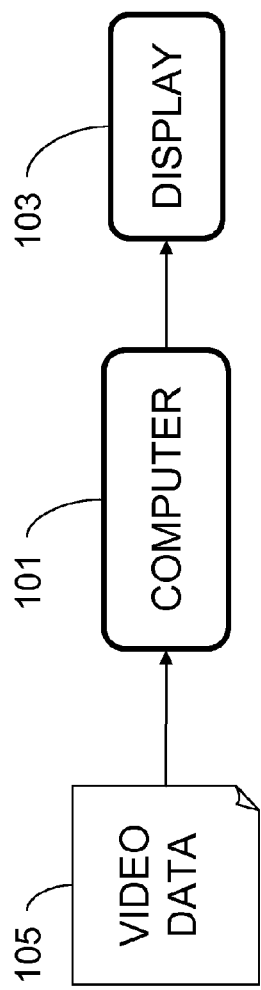
FIG. 1 is a block diagram of a video processing system according to an embodiment of the present invention.

Reference is now made to FIG. 1, which shows a general purpose computer system 101 connected to a display 103. Various different types of connection can be used to connect computer 101 to display 103 including, but not limited to, digital visual interface (DVI), high-definition multimedia interface (HDMI), video graphics array (VGA), analogue YPbPr component, S-Video, SCART and composite video. Computer 101 receives and processes video data 105 for visual display on display 103.

Video data 105 is received by computer 101 compressed according to a video compression format such as, but not limited to, MPEG-1, MPEG-2, MPEG-4, MPEG-4/AVC, H.261, H.262, H.263, H.264, VC-1, AVS, RealVideo and WMV. Processing of video data 105 therefore includes decoding/decompressing video data 105.

The video data 105 received by computer 101 may also be encrypted (obscured to make it unreadable without some special knowledge; sometimes referred to as scrambled). For example, Digital Video Broadcasting (DVB) video streams are encrypted according to the Common Scrambling Algorithm and video streams are often encrypted according to digital rights management technologies such as, but not limited to, FairPlay, Windows Media DRM, CPRM/CPPM etc. In such cases, processing of video data 105 may include decryption/descrambling.

Inside computer 101, video data 105 passes over a user-accessible bus (e.g. PCIe bus) (not shown) and before it passes over such a bus, the video data 105 is sometimes re-encrypted/re-scrambled in order to protect it from unauthorized access. For example and as mentioned above, PVP-UAB encryption ensures that uncompressed video data flows securely from a Windows Vista Protected Environment containing the media player (software decoder) to a video card. In such cases, processing of video data 105 may include re-encryption/re-scrambling.

Figure 2:
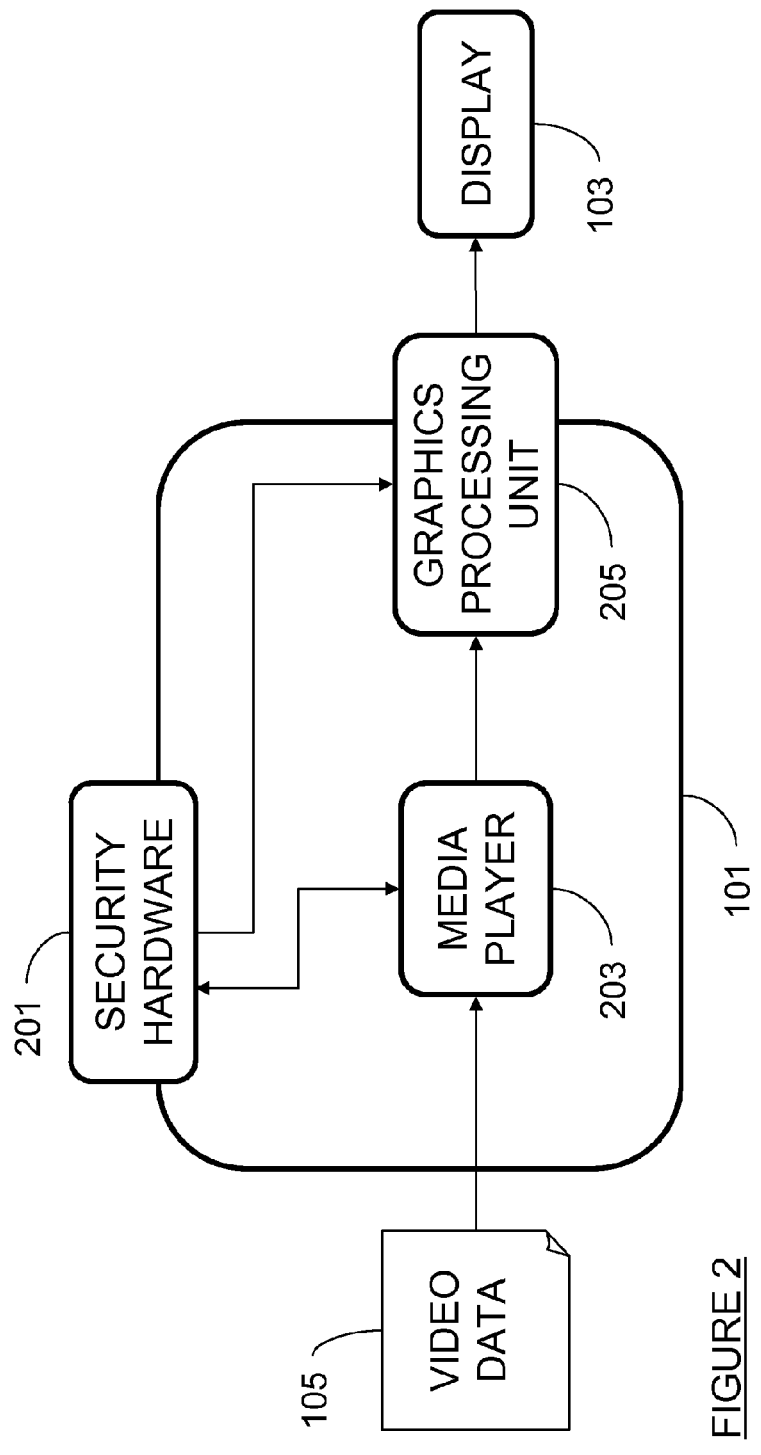
FIG. 2 is a block diagram of a computer forming part of the video processing system of FIG. 1.

Computer 101 will now be described in more detail with reference to FIG. 2. In operative association with computer 101 is security hardware 201, which in this embodiment of the present invention comprises a universal serial bus (USB) dongle plugged into a USB port on computer 101.

Figure 3:
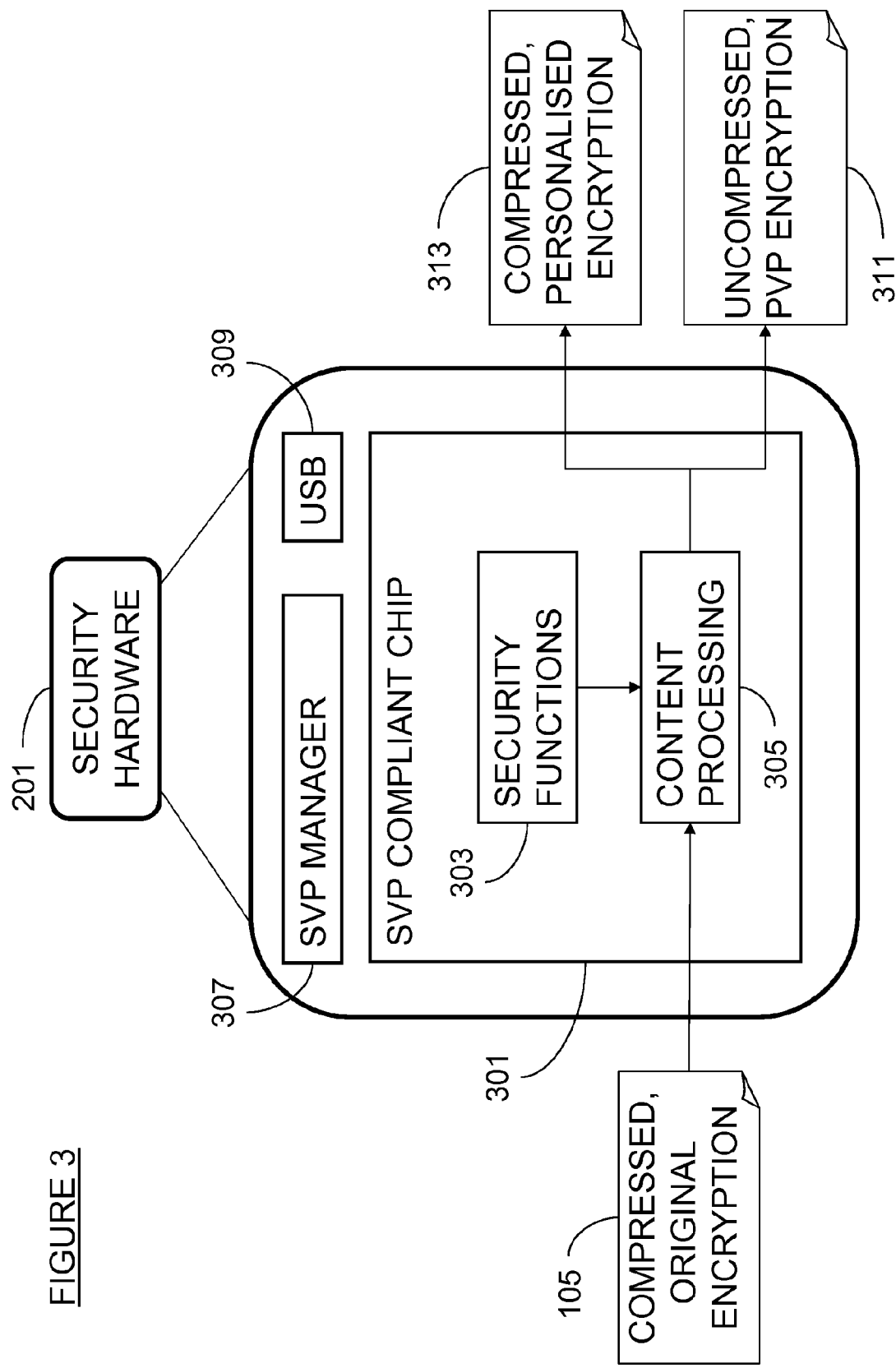
FIG. 3 is a block diagram of security hardware that is connected in operation to the computer of FIG. 2.

Security hardware 201 will now be described in more detail with reference to FIG. 3.

Security hardware 201 comprises SVP compliant chip 301—a chip that complies with the Secure Video Processor (SVP) open standard (see "*SVP Open Content Protection System: Technical Overview*" available at www.svpalliance.org). SVP compliant chip 301 comprises the two main components of security hardware 201: security functions component 303 and content processing component 305.

Content processing component 305 is responsible for processing incoming content, e.g. scrambling/descrambling content, decoding/decompressing content, re-scrambling/re-encrypting content and outputting processed content to computer 101.

In pay TV environments, content is usually delivered encrypted, accompanied by a conditional access (CA) license, encapsulated in entitlement control messages (ECM). ECMs have an additional function-decryption keys are derived from ECMs. ECMs are delivered to users in parallel with associated content. Security functions component 303 processes ECMs and transfers the licenses/keys needed for descrambling/decrypting content to content processing component 305.

The interface between SVP compliant chip 301 and applications in computer 101 is maintained by SVP manager 307, a software component. USB stack 309 provides the software/drivers/controllers etc. that enable security hardware 201 to connect to and be understood by computer 101 via a USB interface.

Security hardware 201 accepts compressed, encrypted video data 105 as an input from said media player 203 and is configured to decrypt a portion of compressed, encrypted video data 105, decompress the compressed, decrypted video data portion, re-encrypt the uncompressed, decrypted video data portion and return an uncompressed, re-encrypted video data portion as an output to a graphics processing unit (GPU) 205 of a video card (e.g. GeForce 6600GT commercially available from NVIDIA Corporation, Santa Clara, Calif., 95050, USA), which renders the uncompressed, re-encrypted video data portion for visual display on display 103, which is connected to computer 101 via GPU 205. In this embodiment of the present invention, security hardware 201 is configured to re-encrypt the uncompressed, decrypted video data portion using PVP-UAB encryption so that the uncompressed, PVP-encrypted video data portion 311 flows securely to GPU 205 and can be decrypted by GPU 205.

In this embodiment of the present invention, the portion of compressed, encrypted video data 105 that is processed by security hardware 201 and output to GPU 205 comprises a critical portion of video data 105 without which viewing of the video content would be substantially impaired.

For example, when video data 105 comprises standard definition (SD) video data with a resolution of 720×480 pixels (480p) or 720×576 (576i) pixels, the portion of compressed, encrypted video data 105 that is processed by security hardware 201 and output to GPU 205 may comprise a 200×200 pixel square portion at the centre of each frame of video data 105, corresponding to approximately 10% of each video frame. Portions of different shapes and sizes will be apparent to someone skilled in the art.

For high definition (HD) video data with a resolution of 1920×1080 pixels (1080i) or 1280×720 (720p) pixels, the portion of compressed, encrypted video data 105 that is processed by security hardware 201 and output to GPU 205 may comprise a 300×300 pixel square portion at the centre of each frame of video data 105. Portions of different shapes and sizes will be apparent to someone skilled in the art.

In this way, security hardware 201 only decodes/decompresses a small portion of the incoming video data 105 (for example, approximately 5% to 12%), which reduces the load on secure hardware 201 because decoding/decompressing this small portion of video data requires less bandwidth and processing power than decoding/decompressing all of the incoming video data 105. Since the decoding (and PVP-encryption) is carried out by the secure hardware 201, the uncompressed, PVP-encrypted video data portion 311 that is output by secure hardware 201 is protected against copying.

Security hardware 201 is further configured to decrypt a different portion of compressed, encrypted video data 105, re-encrypt the compressed, decrypted video data portion and return a compressed, re-encrypted video data portion 313 as an output to a media player 203. In this embodiment of the present invention, security hardware is configured to re-encrypt the compressed, decrypted video data portion using a secure channel encryption method (e.g. a public key encryption scheme). In this way, compressed, re-encrypted video data portion 313 can be personalized so that only media player 203 of computer 101 can decrypt compressed, re-encrypted video data portion 313.

Referring once again to FIG. 2, media player 203 is a software application operable to decrypt, decode and re-encrypt video data (e.g. Windows Media Player from Microsoft Corporation). Media player 203 accepts compressed, re-encrypted video data portion 313 (from security hardware 201) as an input and is configured to decrypt the compressed, re-encrypted video data portion 313, decompress the compressed, decrypted video data portion, re-encrypt the uncompressed, decrypted video data portion and return an uncompressed, re-encrypted video data portion as an output to GPU 205. In this embodiment of the present invention, media player 203 is configured to re-encrypt the uncompressed video data portion using PVP-UAB encryption so that the uncompressed, PVP-encrypted video data portion flows securely to GPU 205 and can be decrypted by GPU 205.

It was stated above that decoding in software is not considered to be secure. However, even if a hacker were to copy the portion of video data that is output by security hardware 201 as compressed, re-encrypted video data portion 313 and subsequently decrypted, decoded and re-encrypted by media player 203, the hacker would not have access to all the video data—a critical portion of video data 105 would be missing and viewing would be substantially impaired. By splitting video decoding between secure and non-secure decoders, the load on the secure hardware is reduced and strong protection can still be provided for critical portions of the video content.

Uncompressed, PVP-encrypted video data portions are received from security hardware 201 and media player 203 at GPU 205. GPU 205 is operable to combine the video data portions using synchronisation methods known to someone skilled in the art (e.g. by identifying individual frame portions using a frame number or time stamp and combining portions of frames (e.g. by overlaying one portion on top of another) having identical frame numbers or time stamps. Other methods of synchronising the video data portions will be apparent to someone skilled in the art). GPU 205 is either operable to decrypt and then combine video data portions or combine the video data portions and then decrypt the combined video data. GPU 205 then outputs the complete video content to display 103.

It will be apparent from the foregoing description that many modifications or variations may be made to the above described embodiments without departing from the invention. Such modifications and variations include:

In the above described embodiment, the critical portion of compressed, encrypted video data 105 that is decrypted, decoded and PVP-encrypted by security hardware 201 comprised a portion at the centre of each frame of video data. In alternative embodiments, the critical portion may comprise a plurality of smaller portions at the centre of each video frame rather than one larger portion; or part of the colour information for each pixel in the video frame rather than the full colour information; or a few video frames every few seconds rather than every video frame; or a portion that changed position in every $n^{th}$ frame (e.g. in a pseudo-random manner, or alternatively in a manner that is controlled by the video content author, etc.).

In the above described embodiment, secure hardware 201 outputted the uncompressed, PVP-encrypted video data portion 311 direct to GPU 205. In alternative embodiments, secure hardware 201 is configured to output the uncompressed, PVP-encrypted video data portion 311 back to media player 203, which does not process the uncompressed, PVP-encrypted video data portion 311 but merely synchronizes/combines it with the other portion of video data that is processed by media player 203 and outputs a single, uncompressed, PVP-encrypted video stream to GPU 205.

In embodiments where the portions of video data are combined by overlaying one portion on top of the other, media player 203 may be configured to deliberately add some other data (e.g. visibly distracting data) to one of the video portions that would be covered up (i.e. invisible) if the other video portion was correctly decrypted, decoded and overlayed on top of the video portion containing the visibly distracting data. Alternatively, secure hardware 201 is operable to add this other data before outputting the video portion to media player 203 or GPU 205.

In other embodiments, secure hardware 201 further comprises a smart card (e.g. SIM card). The smart card can be used to assist with the decryption and re-encryption of video data 105 (and portions thereof) in ways that will be apparent to someone skilled in the art. Inclusion of a smart card is advantageous because security can quickly be restored (by replacing the smart card) if the key protection mechanisms used for decryption and/or re-encryption are compromised.

In the above described embodiments, content processing component 305 of SVP compliant chip 301 decoded part of the video data. In alternative embodiments, secure hardware 201 further comprises a secure internal processor on to which is loaded decoding software. The decoding of video data is then carried out by the decoding software. This is advantageous because if new decoding algorithms are developed, the decoding software can be simply be updated in order to support those new decoding algorithms rather than having to replace the entire secure hardware 201. In other embodiments, a hybrid software/hardware decoder (also called a hardware assisted software decoder) is used to decide the video data.

In the above described embodiment, security hardware 201 was described as being configured to decrypt a portion of compressed, encrypted video data 105 and further configured to decrypt a different portion of compressed, encrypted video data 105. In alternative embodiments, security hardware 201 is configured to decrypt said compressed, encrypted video data 105 in a single operation.

It will be appreciated by someone skilled in the art that the above described invention is applicable to any CA and/or DRM system and any content delivery mechanism such as broadcast or unicast.

In the above described embodiment, decoding in security hardware 201 and media player 203 was done to a pixel level. However, it will be appreciated by someone skilled in the art that the above described invention is applicable when decoding is done to a macroblock level. A macroblock typically represents a block of 16 by 16 pixels. Video content portions are then transferred to GPU 205 in semi-compressed form (e.g. using Microsoft DirectX Video Acceleration).

In alternative embodiments, on receiving and decrypting compressed, encrypted video 105, security hardware 201 analyses the compressed video and categorises all the macroblocks that make up the compressed video data into two sets:

a first set comprising: "key" macroblocks—those macroblocks that are visually important for viewing the video data—and all those macroblocks from which the "key" macroblocks are predicted (if a predictive video coding scheme has been used to encode the video data); and a second set comprising: "other" macroblocks, comprising all those macroblocks not in the first set.

Security hardware 201 then decodes the first set of macroblocks before re-encrypting (e.g. using PVP-UAB encryption) whereas the macroblocks in the second set are re-encrypted (e.g. according to a public key encryption scheme) and transferred to media player 203 for decoding.

In the above described embodiments, security hardware 201 accepts compressed, encrypted video data 105 as an input from media player 203. In alternative embodiments, security hardware 201 accepts compressed, encrypted video data 105 as an input directly from a source external to computer 101 (e.g. a tuner).

In the above described embodiments, media player 203 (a software application) decoded video data. In alternative embodiments, computer 101 comprises a hybrid software/hardware decoder (also known as a hardware assisted software decoder) for decoding video data. An example of such a hardware assisted software decoder is described in "*HD DVD and BD Video Compression Standard*", *Optical Disc Systems*, March-April 2006, pp 74-77", the disclosure of which is hereby incorporated by reference. Most A/V decoding schemes share a certain set of mathematical calculations. By implementing these common functions in hardware, the platform can support many decoding schemes including possibly new schemes.

In the above described embodiments, software was described as running on a CPU. In alternative embodiments, software runs on multiple CPUs (including remote CPUs), software runs on firmware (e.g. ROM, Flash memory, etc.), software runs on a peripheral device attached to the computer (e.g. a USB key, PCI card, etc.)

In alternative embodiments, compressed, encrypted video 105 is subjected to constrained video encoding such that no pixels/macroblocks etc. in the critical portion of compressed, encrypted video data 105 (that is decrypted, decoded and PVP-encrypted by security hardware 201) are predicted from any pixels/macroblocks outside of the critical portion, and such that no pixels/macroblocks etc. that are not in the critical portion of the compressed, encrypted video data 105 are predicted from pixels/macroblocks etc. inside the critical portion.

In another alternative embodiment, the compressed, encrypted video data 105 may be analysed (before it is received by the secure hardware 201) such that the critical portion can be identified as a set of pixels/macroblocks etc. that are not predicted from outside of the critical portion and that are not required in the decoding of data not in the critical portion.

In yet another alternative embodiment, compressed, encrypted video 105 is encrypted such that only security hardware 201 can decrypt the critical portion of compressed, encrypted video data 105 (i.e. media player 203 is not able to remove the decryption that has been applied to the critical portion).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

The invention claimed is:

1. A method for processing video content, said method comprising:
   receiving, in a hardware device connected in operation to a computer, encrypted, encoded video content;
   decrypting said encrypted, encoded video content to form decrypted, encoded video content;
   decoding a first portion of said decrypted, encoded video content to form a decrypted, decoded video content portion;
   re-encrypting said decrypted, decoded video content portion to form a re-encrypted, decoded video content portion;
   re-encrypting a remaining second portion of said decrypted, encoded video content to form a re-encrypted, encoded video content portion; and
   outputting said re-encrypted, decoded video content portion and said re-encrypted, encoded video content portion to said computer.

2. A method according to claim 1, wherein said outputting step comprises outputting said re-encrypted, decoded video content portion directly to a graphics renderer.

3. A method according to claim 2, further comprising, in said computer:
   decrypting said re-encrypted, encoded video content portion to form a second decrypted, encoded video content portion;
   decoding said second decrypted, encoded video content portion to form a second decrypted, decoded video content portion;
   re-encrypting said second decrypted, decoded video content portion to form a second re-encrypted, decoded video content portion; and
   transferring said second re-encrypted, decoded video content portion to said graphics renderer.

4. A method according to claim 1, further comprising, in said computer:
   decrypting said re-encrypted, encoded video content portion to form a second decrypted, encoded video content portion;
   decoding said second decrypted, encoded video content portion to form a second decrypted, decoded video content portion;
   re-encrypting said second decrypted, decoded video content portion to form a second re-encrypted, decoded video content portion; and
   transferring said re-encrypted, decoded video content portion and said second re-encrypted, decoded video content portion to a graphics renderer.

5. A method according to claim 4, further comprising:
   combining said re-encrypted, decoded video content portion and said second re-encrypted, decoded video content portion.

6. A method according to claim 5, wherein said combining step comprises: overlaying said re-encrypted, decoded video content portion on top of said second re-encrypted, decoded video content portion or vice versa.

7. A method according to claim 5, wherein said combining step comprises: in said computer, combining said re-encrypted, decoded video content portion and said second re-encrypted, decoded video content portion to form re-encrypted, decoded video content, said method further comprising: in said computer, outputting said re-encrypted, decoded video content to said graphics renderer.

8. A method according to claim 7, further comprising: decrypting said re-encrypted, decoded video content in said graphics renderer.

9. A method according to claim 8, wherein said combining step comprises: overlaying said de-encrypted, decoded video content portion on top of said second de-encrypted, decoded video content portion or vice versa.

10. A method according to claim 5, wherein said combining step comprises: in said graphics renderer, combining said re-encrypted, decoded video content portion and said second re-encrypted, decoded video content portion to form re-encrypted, decoded video content.

11. A method according to claim 5, further comprising: adding encoded video data to said second decrypted, encoded video content portion such that said encoded video data is invisible after said combining step.

12. A method according to claim 5, further comprising: adding decoded video data to said second decrypted, decoded video content portion such that said decoded video data is invisible after said combining step.

13. A method according to claim 4, further comprising in said graphics renderer:
   decrypting said re-encrypted, decoded video content portion to form a first decrypted, decoded video content portion;
   decrypting said second re-encrypted, decoded video content portion to form a second re-decrypted, decoded video content portion; and
   combining said first decrypted, decoded video content portion and said second re-decrypted, decoded video content portion to form decrypted, decoded video content.

14. A method according to claim 1, wherein re-encrypting said second portion of said decrypted, encoded video content comprises re-encrypting said second portion of said decrypted, encoded video content such that it can only be decrypted by said computer.

15. A method according to claim 14, wherein the re-encrypting recited in claim 5 further comprises re-encrypting said second portion of said decrypted, encoded video content according to a secure channel encryption algorithm.

16. A method according to claim 1, wherein said first portion of said decrypted, encoded video content comprises a critical portion of said decrypted, encoded video content.

17. A method according to claim 16, wherein said first portion of said decrypted, encoded video content comprises one or more portions of each frame of said decrypted, encoded video content.

18. A method according to claim 16 wherein said first portion of said decrypted, encoded video content comprises part of the colour information for each pixel in each frame of said decrypted, encoded video content.

19. A method according to claim 17, wherein one or more portions of each frame of said decrypted, encoded video content change size and/or position in every $n^{th}$ frame.

20. A method according to claim 16, wherein said first portion of said decrypted, encoded video content comprises one or more video frames every few seconds.

21. A method according to claim 1, wherein receiving said encrypted, encoded video content comprises receiving said encrypted, encoded video content from said computer.

22. A method according to claim 1, wherein decrypting said encrypted, encoded video content comprises: decrypting a first portion of said encrypted, encoded video content to form said first portion of said decrypted, encoded video content; and decrypting a second portion of said encrypted, encoded video content to form said second portion of said decrypted, encoded video content.

23. A method for processing video content, said method comprising:
receiving, in a hardware device connected in operation to a computer, encrypted, encoded video content;
decrypting a first portion of said encrypted, encoded video content to form a first decrypted, encoded video content portion;
decoding said first decrypted, encoded video content portion to form a decrypted, decoded video content portion;
re-encrypting said decrypted, decoded video content portion to form a re-encrypted, decoded video content portion;
decrypting a remaining second portion of said encrypted, encoded video content to form a second decrypted, encoded video content portion;
re-encrypting said second decrypted, encoded video content portion to form a re-encrypted, encoded video content portion; and
outputting said re-encrypted, decoded video content portion and said re-encrypted, encoded video content portion to said computer.

24. A method according to claim 23, wherein said decrypting of said first portion and said decrypting of said second portion of said encrypted, encoded video content comprise a single decryption operation.

25. A method for processing video content, said method comprising:
receiving, in a hardware device connected in operation to a computer, encrypted, encoded video content;
decrypting a first portion of said encrypted, encoded video content to form a first decrypted, encoded video content portion;
decoding said first decrypted, encoded video content portion to form a first decrypted, decoded video content portion;
re-encrypting said first decrypted, decoded video content portion to form a first re-encrypted, decoded video content portion; and outputting said first re-encrypted, decoded video content portion and a remaining portion of said encrypted, encoded video content to said computer.

26. A method according to claim 25, wherein said outputting step comprises outputting said first re-encrypted, decoded video content portion directly to a graphics renderer.

27. A method according to claim 26, further comprising, in said computer:
decrypting said remaining portion of said encrypted, encoded video content to form a second decrypted, encoded video content portion;
decoding said second decrypted, encoded video content portion to form a second decrypted, decoded video content portion;
re-encrypting said second decrypted, decoded video content portion to form a second re-encrypted, decoded video content portion; and
transferring said second re-encrypted, decoded video content portion to said graphics renderer.

28. A method according to claim 27, further comprising:
combining said first re-encrypted, decoded video content portion and said second re-encrypted, decoded video content portion.

29. A method according to claim 28, wherein said combining step comprises: overlaying said first re-encrypted, decoded video content portion on top of said second re-encrypted, decoded video content portion or vice versa.

30. A method according to claim 28, wherein said combining step comprises: in said graphics renderer, combining said first re-encrypted, decoded video content portion and said second re-encrypted, decoded video content portion to form re-encrypted, decoded video content.

31. A method according to claim 25, further comprising, in said computer:
decrypting said remaining portion of said encrypted, encoded video content to form a second decrypted, encoded video content portion;
decoding said second decrypted, encoded video content portion to form a second decrypted, decoded video content portion;
re-encrypting said second decrypted, decoded video content portion to form a second re-encrypted, decoded video content portion; and
transferring said first re-encrypted, decoded video content portion and said second re-encrypted, decoded video content portion to a graphics renderer.

32. A method according to claim 31, further comprising:
combining said first re-encrypted, decoded video content portion and said second re-encrypted, decoded video content portion.

33. A method according to claim 32, wherein said combining step comprises: overlaying said first re-encrypted, decoded video content portion on top of said second re-encrypted, decoded video content portion or vice versa.

34. A method according to claim 32, wherein said combining step comprises: in said computer, combining said first re-encrypted, decoded video content portion and said second re-encrypted, decoded video content portion to form re-encrypted, decoded video content, said method further comprising: in said computer, outputting said re-encrypted, decoded video content to said graphics renderer.

35. A method according to claim 34, further comprising: decrypting said re-encrypted, decoded video content in said graphics renderer.

36. A method according to claim 32, further comprising:
adding decoded video data to said second decrypted, decoded video content portion such that said decoded video data is invisible after said combining step.

37. A method according to claim 31, further comprising in said graphics renderer:
decrypting said first re-encrypted, decoded video content portion to form a first re-decrypted, decoded video content portion;
decrypting said second re-encrypted, decoded video content portion to form a second re-decrypted, decoded video content portion; and
combining said first re-decrypted, decoded video content portion and said second re-decrypted, decoded video content portion to form decrypted, decoded video content.

38. A method according to claim 37, wherein said combining step comprises: overlaying said first re-decrypted, decoded video content portion on top of said second re-decrypted, decoded video content portion or vice versa.

39. A hardware device for processing video content, wherein said hardware device is connected in operation to a computer, said hardware device comprising:
means for receiving encrypted, encoded video content;
means for decrypting said encrypted, encoded video content to form decrypted, encoded video content;
means for decoding a first portion of said decrypted, encoded video content to form a decrypted, decoded video content portion;
means for re-encrypting said decrypted, decoded video content portion to form a re-encrypted, decoded video content portion, and for re-encrypting a remaining second portion of said decrypted, encoded video content to form a re-encrypted, encoded video content portion; and
means for outputting said re-encrypted, decoded video content portion and said re-encrypted, encoded video content portion to said computer.

40. A hardware device according to claim 39, wherein said decrypting means includes a smart card.

41. A hardware device according to claim 39, wherein said hardware device is connected in operation to said computer via a universal serial bus interface.

42. A hardware device according to claim 39, wherein said decoding means comprises a software decoder.

43. A hardware device according to claim 39, wherein said decoding means comprises a hardware assisted software decoder.

44. A hardware device for processing video content, wherein said hardware device is connected in operation to a computer, said hardware device comprising:
a receiver operable to receive encrypted, encoded video content;
a decryptor operable to decrypt said encrypted, encoded video content to form decrypted, encoded video content;
a decoder operable to decode a first portion of said decrypted, encoded video content to form a decrypted, decoded video content portion;
an encryptor operable to re-encrypt said decrypted, decoded video content portion to form a re-encrypted, decoded video content portion, and further operable to re-encrypt a remaining second portion of said decrypted, encoded video content to form a re-encrypted, encoded video content portion; and
an outputter operable to output said re-encrypted, decoded video content portion and said re-encrypted, encoded video content portion to said computer.

45. A hardware device according to claim 44, wherein said decryptor includes a smart card.

46. A hardware device according to claim 44, wherein said hardware device is connected in operation to said computer via a universal serial bus interface.

47. A hardware device according to claim 44, wherein said decoder comprises a software decoder.

48. A hardware device according to claim 44, wherein said decoder comprises a hardware assisted software decoder.

49. A hardware device for processing video content, wherein said hardware device is connected in operation to a computer, said hardware device comprising:
a receiver operable to receive encrypted, encoded video content;
a decryptor operable to decrypt a first portion of said encrypted, encoded video content to form a first decrypted, encoded video content portion;
a decoder operable to decode said first decrypted, encoded video content portion to form a decrypted, decoded video content portion; and
an encryptor operable to re-encrypting said decrypted, decoded video content portion to form a re-encrypted, decoded video content portion;
wherein said decryptor is further operable to decrypt a second portion of said encrypted, encoded video content to form a second decrypted, encoded video content portion; and wherein said encryptor is further operable to re-encrypt said second decrypted, encoded video content portion to form a re-encrypted, encoded video content portion;
said hardware device further comprising:
an outputter operable to output said re-encrypted, decoded video content portion and said re-encrypted, encoded video content portion to said computer.

* * * * *

UNITED STATES PATENT AND TRADEMARK OFFICE
CERTIFICATE OF CORRECTION

PATENT NO. : 8,379,852 B2
APPLICATION NO. : 12/448789
DATED : February 19, 2013
INVENTOR(S) : Wachtfogel et al.

It is certified that error appears in the above-identified patent and that said Letters Patent is hereby corrected as shown below:

In the Claims

Column 12, line 65, claim 15, delete "claim 5" and substitute therefor --claim 14--

Signed and Sealed this
Fourth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,379,852 B2
APPLICATION NO. : 12/448789
DATED : February 19, 2013
INVENTOR(S) : Wachtfogel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

First Day of September, 2015

Michelle K. Lee
*Director of the United States Patent and Trademark Office*